United States Patent Office.

MARK S. THOMPSON, OF NEW YORK, N. Y., ASSIGNOR TO ROBERT H. MARTIN, OF SAME PLACE.

TREATING ASBESTUS TO FORM CRUCIBLES, &c.

SPECIFICATION forming part of Letters Patent No. 330,171, dated November 10, 1885.

Application filed October 7, 1885. Serial No. 179,258. (Specimens.)

*To all whom it may concern:*

Be it known that I, MARK S. THOMPSON, a citizen of the United States, residing at New York, in the county and State of New York, have invented new and useful Improvements in Treating Asbestus to form Crucibles, &c., of which the following is a specification.

The object of this invention is to prepare from asbestus crucibles, molds, dies, soldering-blocks, and other articles which are sometimes exposed to a temperature of several thousand degrees.

My invention consists in mixing a fibrous asbestus with a liquid—such as water or a solution of an adhesive substance in a suitable solvent—enough liquid being used to form a plastic mass, then placing this plastic mass into a suitable mold, and finally exposing it to a high pressure; also, in a vessel or melting-pot produced from fibrous asbestus.

In carrying out my invention I take asbestus which is already in a fibrous condition, or I reduce the asbestus to a fibrous condition, and then I mix the asbestus fibers intimately with a suitable liquid—such as water, or with a solution of an adhesive substance in a suitable solvent—so as to form a plastic mass of the consistency of potters' clay. This plastic mass is then introduced into a suitable mold and exposed to a very high pressure, whereby almost all the liquid is expelled and the asbestus fibers are compressed to such a degree that the article produced is hard and durable. By these means I am enabled to produce different articles—such, for instance, as a crucible or pot for melting gold and other metals—which will stand the heat of several thousand degrees, and which is not liable to separate in leaves or fibers. Heretofore and prior to this invention asbestus had been made into paper sheathing by separating the same into fibers, throwing or depositing these fibers evenly over the surface of a table or apron, forming a mat or bat, subjecting this bat to a spray or sprinkling of water or glutinous solution, and finally subjecting the wetted bat to a pressure, preferably by passing it through between rollers. It will be seen that in this case the bat formed of asbestus fibers is simply moistened or wetted and then exposed to pressure by passing it through between the rollers.

According to my invention the asbestus fibers must be intimately mixed with a sufficient quantity of liquid to form a plastic mass of the consistency of potters' clay, from which, when the same is introduced into suitable molds and exposed to pressure, a great many different articles can be produced, as above set forth.

What I claim as new, and desire to secure by Letters Patent, is—

1. The within-described process for treating asbestus, which consists in mixing asbestus fibers with a suitable liquid—such as water—to form a plastic mass, then placing this plastic mass into a suitable mold, and finally exposing it to a high pressure.

2. As a new article of manufacture, a vessel or melting-pot prepared from fibrous asbestus.

In testimony whereof I have hereunto set my hand and seal in the presence of two subscribing witnesses.

MARK S. THOMPSON. [L. S.]

Witnesses:
 W. HAUFF,
 E. F. KASTENHUBER.